(12) United States Patent
McCullough

(10) Patent No.: US 9,049,385 B1
(45) Date of Patent: Jun. 2, 2015

(54) TOOL FOR SYNCHRONIZING VIDEO MEDIA CLIPS

(71) Applicant: Robert K. McCullough, Broken Arrow, OK (US)

(72) Inventor: Robert K. McCullough, Broken Arrow, OK (US)

( * ) Notice: Subject to any disclaimer, the term of this patent is extended or adjusted under 35 U.S.C. 154(b) by 0 days.

(21) Appl. No.: 14/321,449

(22) Filed: Jul. 1, 2014

(51) Int. Cl.
*H04N 21/8547* (2011.01)
*G11B 27/10* (2006.01)
*H04N 5/265* (2006.01)

(52) U.S. Cl.
CPC ...................................... *H04N 5/265* (2013.01)

(58) Field of Classification Search
USPC .............. 352/3, 12, 22, 23, 24; 386/201, 207, 386/223
See application file for complete search history.

(56) References Cited

U.S. PATENT DOCUMENTS

| | | | | |
|---|---|---|---|---|
| 5,018,027 | A * | 5/1991 | Roggendorf | ................... 386/241 |
| 5,457,507 | A | 10/1995 | Berardi | |
| 5,638,151 | A * | 6/1997 | Berardi | .............................. 352/3 |
| 6,430,361 | B2 * | 8/2002 | Lee | ................................ 386/203 |
| 6,831,729 | B1 | 12/2004 | Davies | |
| 7,200,320 | B1 * | 4/2007 | Denecke et al. | ............... 386/201 |
| 7,236,225 | B2 * | 6/2007 | Haubmann | ....................... 352/12 |
| 8,041,190 | B2 * | 10/2011 | Candelore et al. | ............. 386/287 |
| 8,111,326 | B1 * | 2/2012 | Talwar | ........................... 348/500 |
| 8,184,209 | B2 | 5/2012 | Wayne et al. | |
| 8,867,896 | B2 * | 10/2014 | Scheele et al. | ................. 386/248 |
| 2001/0036356 | A1 * | 11/2001 | Weaver et al. | ................... 386/52 |
| 2015/0023647 | A1 * | 1/2015 | Nojima | .......................... 386/201 |

FOREIGN PATENT DOCUMENTS

EP  WO2014053474  4/2014

* cited by examiner

*Primary Examiner* — William C Dowling
(74) *Attorney, Agent, or Firm* — Gable Gotwals; Frank J. Catalano

(57) ABSTRACT

A video media clip synchronization tool has a timeline display which indicates, from its beginning, the running time of a video shooting event in hours, minutes and seconds. The tool also has two video frame displays which sequentially indicate frame numbers within a current second of the video shooting event. One of the video frame displays indicates the odd numbered frames within the current second of the video shooting event and the other of the video frame displays indicates the even numbered frames within the current second of the video shooting event. A single video frame number is displayed when the clips of video media and the video frame displays are synchronized. Adjacent odd and even video frame numbers are simultaneously displayed when the clips of video media and the video frame displays are not synchronized.

4 Claims, 5 Drawing Sheets

Fig. 8
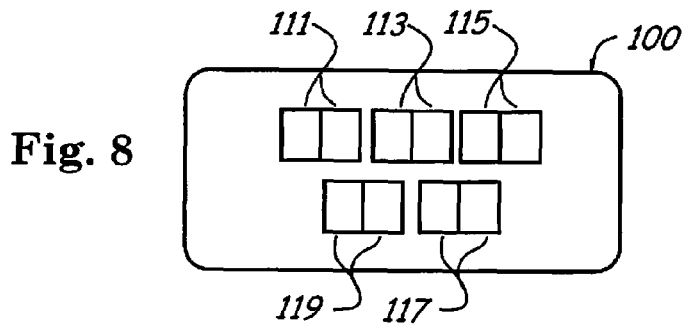
Fig. 9
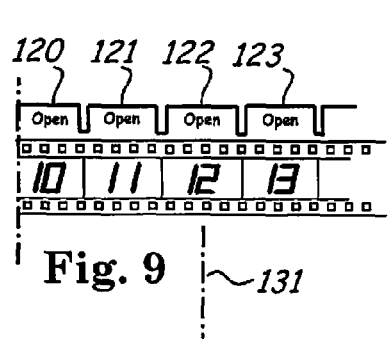
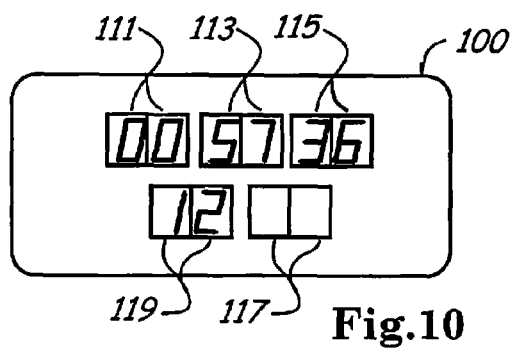
Fig. 10
Fig. 11
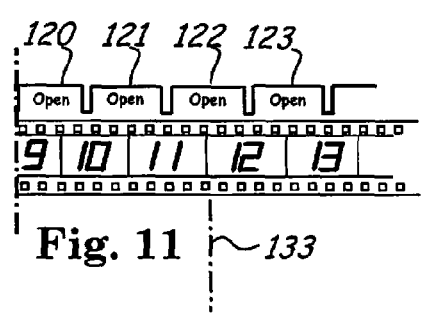
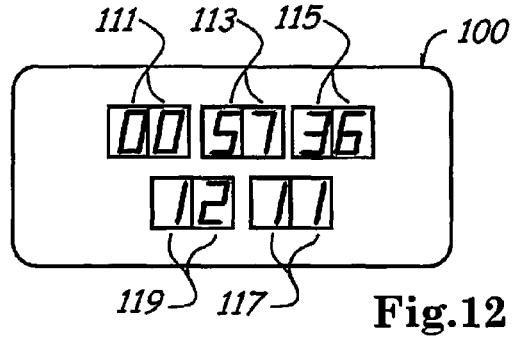
Fig. 12
Fig. 13
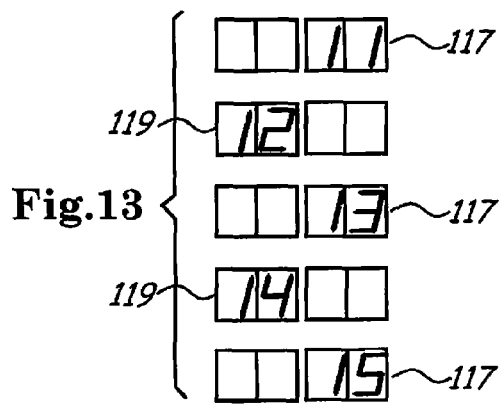
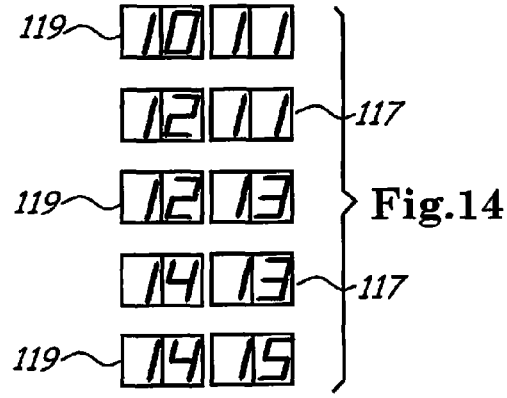
Fig. 14

TOOL FOR SYNCHRONIZING VIDEO MEDIA CLIPS

BACKGROUND OF THE INVENTION

This invention relates generally to video media clip synchronization and more particularly concerns video frame displays used to facilitate synchronization of video media clips with their corresponding video frame numbers.

When using high end film and video cameras, a time code is embedded in the stored video so that, during post production and editing, video from multiple cameras and audio from multiple sources can be synchronized. In recent years, the quality of the picture provided by consumer and hobby grade digital cameras and video recorders has improved to the point that they are useful for commercial film and production purposes. However, these low-end cameras are not capable of embedding the necessary time code or numbering the frames of the video they take. Therefore, a film producer using such cameras must resort to painstaking manual methods of post-production synchronization.

A synchronized digital display of hours:minutes:seconds: frames (H:M:S:F) can be made visible for the first few seconds of every film shoot. However, since the camera frame capture timing is not synchronized to the H:M:S:F display, the camera aperture is often in its opened condition during the transition from one frame count to another. As a result, the frames portion of the display is so completely blurred that the time code is useless for synchronization purposes.

It is, therefore, an object of this invention to provide a tool for synchronizing clips of video media which is useful in creating timeline markings on the beginnings of each video clip used in multi camera shoots. And it is an object of this invention to provide a tool for synchronizing clips of video media which creates timeline markings useful in assembling the video clips into a coherent sequence in post-production editing.

SUMMARY OF THE INVENTION

In accordance with the invention, a tool for synchronizing clips of video media recorded during a video shooting event has two video frame displays. The video frame displays sequentially indicate the numbers of the frames within a current second of the video shooting event. One video frame display indicates the odd numbered frames and the other video frame display indicates the even numbered frames within the current second of the video shooting event. The tool displays a single frame number when the clips of video media and the video frame displays are synchronized. The tool simultaneously displays adjacent odd and even frame numbers when the clips of video media and the video frame displays are not synchronized. The tool may also have a timeline display which indicates, from its beginning, the running time of the video shooting event in hours, minutes and seconds.

BRIEF DESCRIPTION OF THE DRAWINGS

Other objects and advantages of the invention will become apparent upon reading the following detailed description and upon reference to the drawings in which:

FIG. 8 is a front view of a synchronization display in accordance with the invention;

FIG. 9 is a graphic illustration of the tool display of FIG. 8 during in-synchronization operation;

FIG. 10 is a front view of the tool display of FIG. 8 during in-synchronization operation;

FIG. 11 is a graphic illustration of the operation of the tool display of FIG. 8 during out-of-synchronization operation;

FIG. 12 is a front view of the tool display of FIG. 8 during out-of-synchronization operation;

FIG. 13 is a front view illustrating sequential operation of the video frame display of FIG. 8 during in-synchronization operation;

FIG. 14 is a front view illustrating sequential operation of the video frame display of FIG. 8 during not-in-synchronization operation;

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
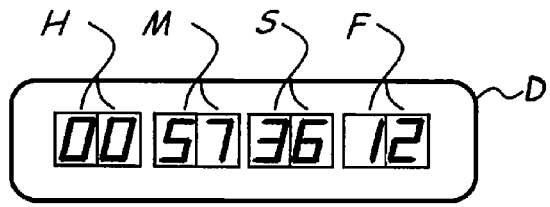
FIG. 1 is a front view of a synchronization display in accordance with the prior art.

FIGS. 1-7 are representative of prior art devices. Looking first at FIG. 1, known timeline and video aperture displays D indicate the running time of a video shooting event followed by the frame number F of the video clip. The running time is indicated in hours H, minutes M and seconds S. As an example chosen for the purposes of this disclosure, the one second interval of running time taken from the beginning or zero moment of a video shooting event and indicated in FIG. 1 is 00 hours, 57 minutes, 36 seconds.

Figure 2:
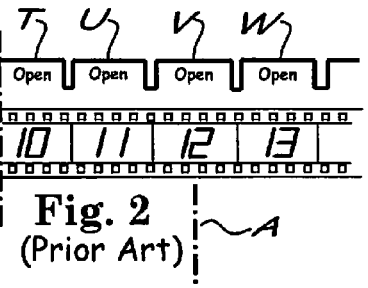
FIG. 2 is a graphic illustration of the tool display of FIG. 1 during in-synchronization operation.
Figure 4:
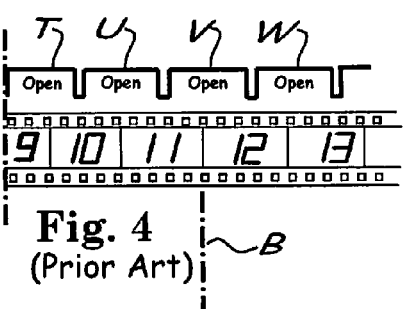
FIG. 4 is a graphic illustration of the operation of the tool display of FIG. 1 during out-of-synchronization operation.

Looking at FIGS. 2 and 4, assume for the purposes of this disclosure that the selected frame count of the prior art device is set at 30 frames per second. At 30 frames/second, if the camera lens-opened time is ¹⁄₄₀ of a second, or 25 mS, the camera lens-closed time will be 1/120 of a second or 8.333 mS. The frame interval is 1/30 of a second, or 33.333 mS.

In the portion of the video shooting event shown in FIG. 2, the video aperture opens and closes four times, being opened during 25 mS intervals T, U, V and W and closed for 8.333 mS intervals between. As shown, the video frame number will appear for the same duration as the video aperture open intervals. However, the time during which the video frame number is indicated could extend for substantially all or any part of the video frame interval.

Figure 3:
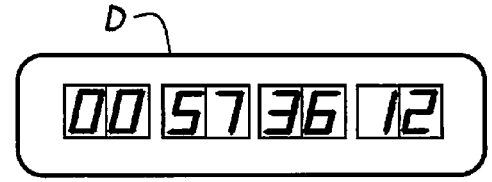
FIG. 3 is a front view of the tool display of FIG. 1 during in-synchronization operation.

In FIG. 2, the intervals T, U, V and W are shown in synchronization with the frame numbers 10, 11, 12 and 13, respectively, as indicated at the axis A. For the 33.333 mS interval including the 25 mS aperture open time V and the subsequent 8.333 mS aperture closed time, the frame number F of the display D is 12, as is seen in FIGS. 1 and 3.

Figure 5:
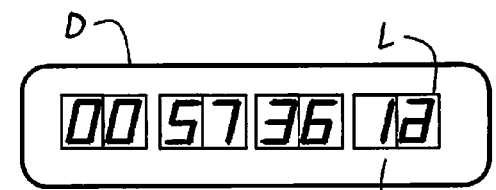
FIG. 5 is a front view of the tool display of FIG. 1 during out-of-synchronization operation.

In FIG. 4, the intervals T, U, V and W are shown as out-of-synchronization with the frame numbers 10, 11, 12 and 13, respectively, as indicated at the axis B. During the 33.333 mS interval including the 25 mS aperture open time V and the subsequent 8.333 mS aperture closed time, the frame number F of the display D is 11 for approximately half the interval V and 12 for the remainder of the interval V, as is seen in FIG. 5. Because the approximate half intervals are on the order of only 16.666 mS, the video recorder and the human eye see the numbers 11 and 12 superimposed at K and L, which is the same number 1 as indicated at K but an unidentifiable character, 2 superimposed by 3, as indicated at L.

Figure 6:
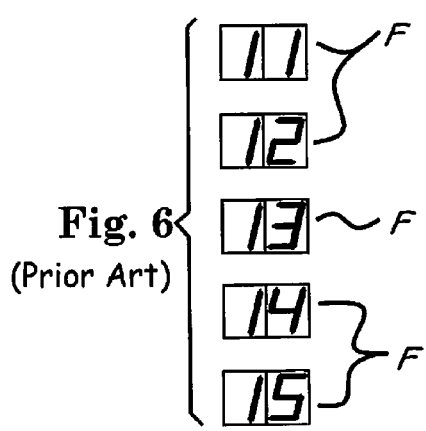
FIG. 6 is a front view illustrating sequential operation of the video frame display of FIG. 1 during in-synchronization operation.
Figure 7:
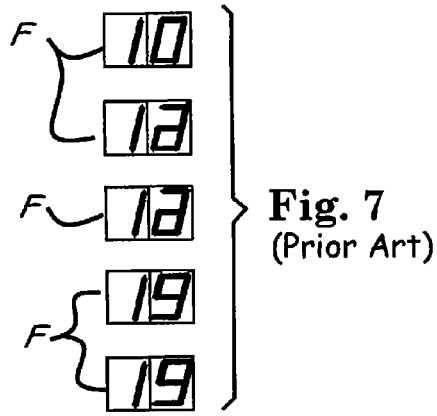
FIG. 7 is a front view illustrating sequential operation of the video frame display of FIG. 1 during not-in-synchronization operation.

Looking at FIG. 6, for in-synchronization operation, the video frame number F will be correctly displayed by the prior art device. But, looking at FIG. 7, for out-of-synchronization operation, between frames 10 and 11 the indicated video number will be 10, between frames 11 and 12 and between frames 12 and 13 the indicated video frame number will be 1 and the same unidentifiable character resulting from superimposition of 2 and 3, and between frames 13 and 14 and between frames 14 and 15 the indicated number will be the same 19. Extrapolating this progression would reveal that between frames 15 and 16 the indicated video frame number would be 16, but for frames between 16 and 17, 17 and 18, 18 and 19 and 19 and 20, the indicated video frame numbers would always be 18. As a result, the prior art device does indicate the synchronized condition correctly, but is of little help in aligning multiple video media clips in a not-in-synchronization shooting event.

A video media clip synchronization tool according to the present invention is represented in FIGS. 8-14. Looking at FIG. 8, the tool display 100 includes a timeline display 100 which indicates, from its beginning, the running time of a video shooting event in hours 111, minutes 113 and seconds 115. The tool display also includes two video frame displays 117 119 which indicate video frame numbers within a current second of the video shooting event. One video frame display 117 indicates only odd numbered video frames within the current second of the video shooting event, as shown video frame number 11, and the other video frame display 119 indicates only even numbered video frames within the current second of the video shooting event, as shown video frame number 12.

For the purposes of this disclosure, assume that the selected video frame count of the tool is set at 30 video frames per second with a camera lens-opened time of 25 mS, a camera lens-closed time of 8.333 mS and the frame interval is 33.333 mS, the same criteria as applied in the previous discussion of the prior art device.

In the portion of the video shooting event shown in FIGS. 9 and 11, which includes video frames number 10, 11, 12 and 13, the video aperture opens and closes four times, being opened during 25 mS intervals 120, 121, 122 and 123 and closed for 8.333 mS intervals between. At a 30 frames/second rate, the video frame counts would begin at 00 and progress to 29, resuming at 00 for the next one second segment. As shown, the video frame indication will appear for the same duration as the video aperture open intervals. However, as with the prior art display, the time during which the video frame number is indicated could extend for substantially all or any part of the video frame interval.

In FIG. 9, the intervals 120, 121, 123 and 124 are shown in synchronization with the video frame numbers 10, 11, 12 and 13, respectively, as indicated by the axis 131. For the 33.333 mS interval including the 25 mS aperture open time 122 and the subsequent 8.333 mS aperture closed time, the video frame number 119 of the display 100 is 12, as is seen in FIG. 10.

In FIG. 11, the intervals 120, 121, 122 and 123 are shown as out-of-synchronization with the frame numbers 10, 11, 12 and 13, respectively, as indicated at the axis 133. During the 33.333 mS interval including the 25 mS aperture open time 122 and the subsequent 8.333 mS aperture closed time, the video frame number is 11 for approximately half the interval 122 and 12 for the remainder of the interval 122.

As is seen in FIG. 12, odd video frame numbers appear in one video frame display 117 and even frame numbers appear in the other video frame display 119. Because the odd and even numbers are not superimposed, at editing operation speeds the video recorder and the human eye simultaneously see both numbers 11 and 12, one in each of the separate video frame displays 117 and 119.

Looking at FIG. 13, for in-synchronization operation the odd video frame numbers, such as 11, 13 and 15 shown, will be correctly displayed by the tool in one video frame display 117 and the even video frame numbers, such as 12 14 shown, will be correctly displayed by the tool in the other video frame display 119.

Looking at FIG. 14, for out-of-synchronization operation, the adjacent odd and even video frame numbers for a single camera-lens-opened-and-closed interval are simultaneously displayed. As a result, the tool of the present invention not only indicates the in-synchronization condition correctly, but is also of great assistance to a user trying to bring a not-in-synchronization system into synchronization and/or to a user trying to impress a clear timeline marking onto a video clip for post-production editing, whether or not in synchronization.

Figure 15:
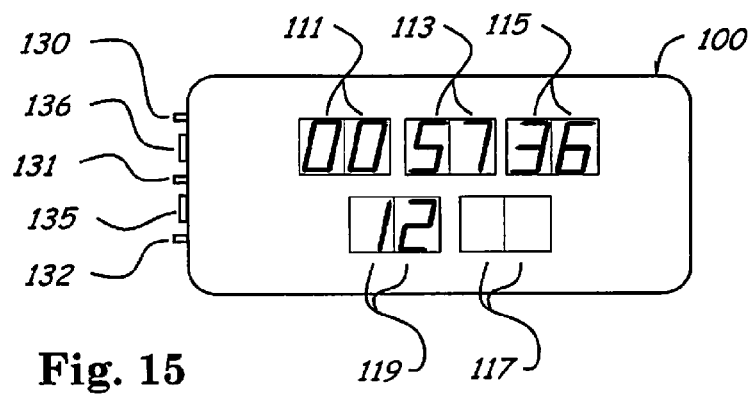
FIG. 15 is a front view of a synchronizing tool in accordance with the invention showing the video frame display illustrated in FIG. 10.
Figure 16:
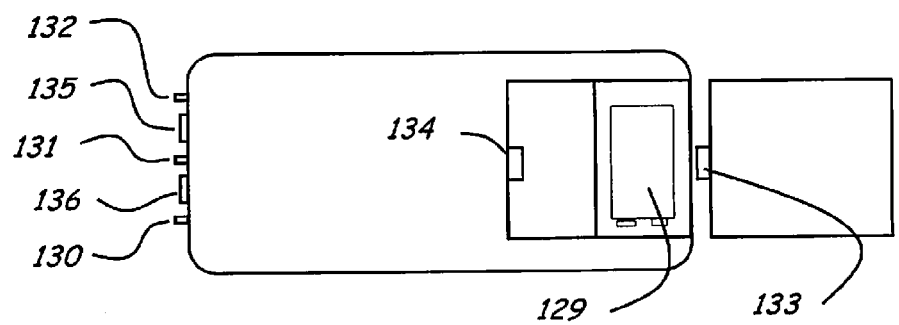
FIG. 16 is a rear view of the synchronizing tool of FIG. 15 with the back cover opened.

Looking at FIGS. 15 and 16, an embodiment of the video media clip synchronization tool 100 according to the present invention is shown in which the timeline hour, minute and second display 111, 113 and 115, respectively, and the odd and even video frame displays 117 and 119, respectively, are placed in an above and below configuration on the front of the tool 100. Other configurations may be desirable to different users.

The battery 129 powering the tool 100 is accessible via a removable cover 133 secured by a cover latch 134 on the back of the tool 100.

Also as shown, the push buttons 130, 131 and 132 are +/mode select/− buttons allowing user control and the jacks 135 and 136 are 1/8" mini-jack input and output connectors, respectively. When you connect the input jack 135 to a standard SMPTE device, such as a Denecke SB-3 Syncbox Time Code Generator, the tool 100 will synchronize with the standard device and display the same time and video frame number even after being disconnected for many hours. If you connect the output jacks 136 of the tools 100 to the input jacks of two or more other tools 100, they will synchronize and show the same time and video frame number even though disconnected.

Typically, users of the tool 100 will synchronize several devices together and each cameraman will carry one of the tools 100. Just before shooting at different angles, the cameramen will shoot a short clip of the tool display to tag the clip with a time code.

Figure 17:
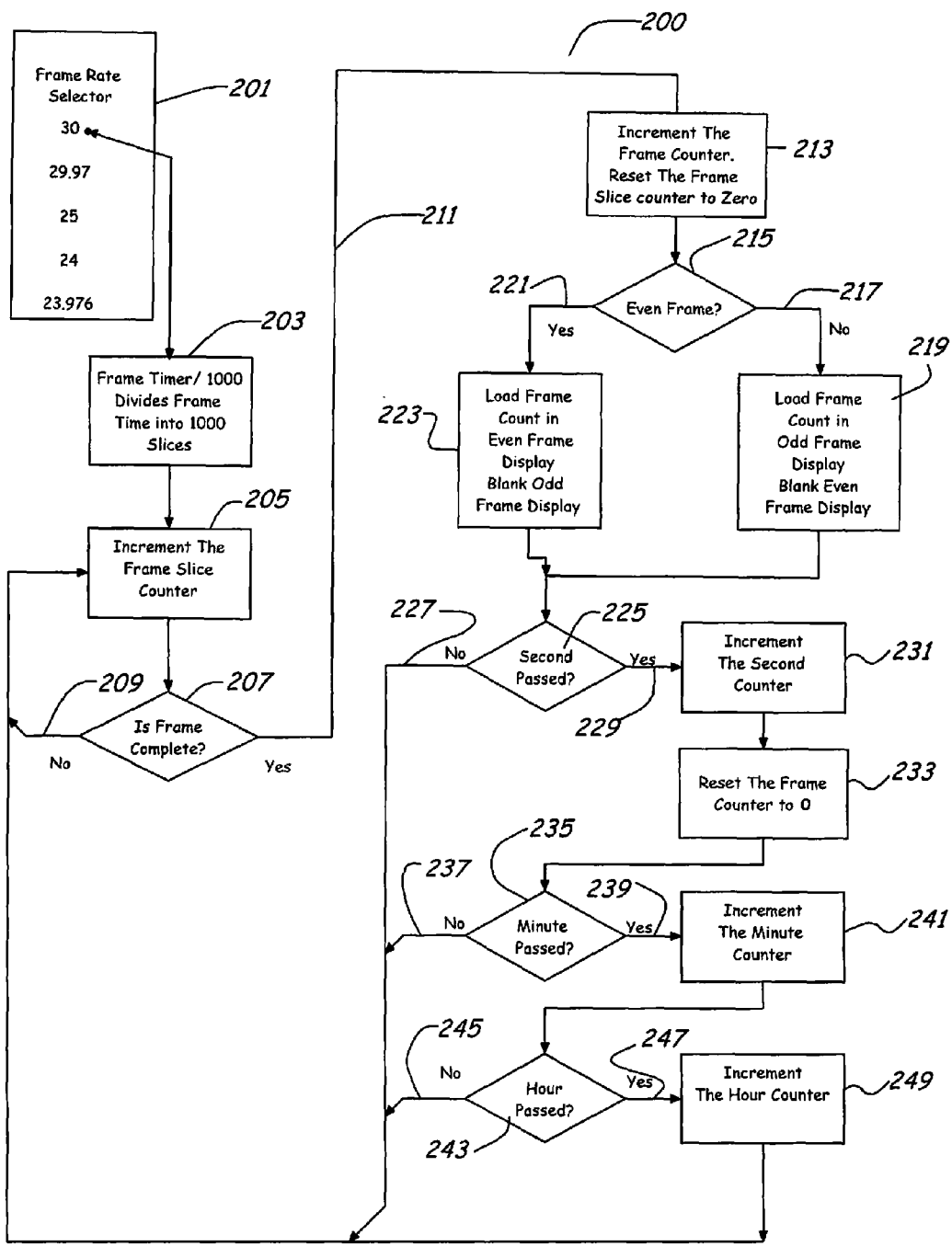
FIG. 17 is a logic diagram for the video frame display of the synchronizing tool of FIG. 15.
Figure 22:
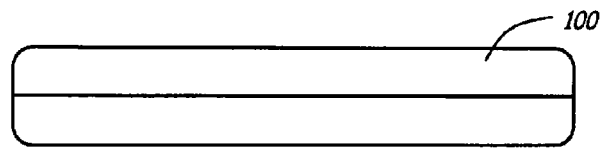
FIG. 22 is a top view of the synchronizing tool of FIG. 15.
Figure 20:
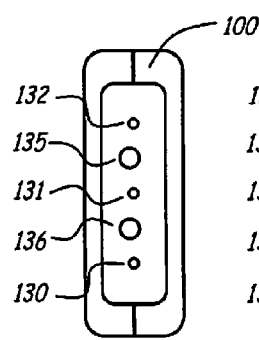
FIG. 20 is a left side view of the synchronizing tool of FIG. 15.
Figure 18:
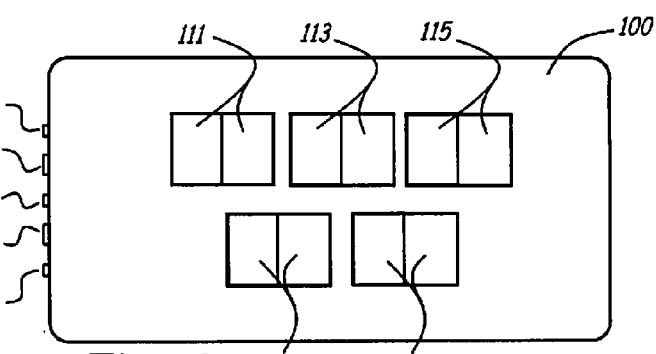
FIG. 18 is a front view of the synchronizing tool of FIG. 15 in an "off" condition.
Figure 21:
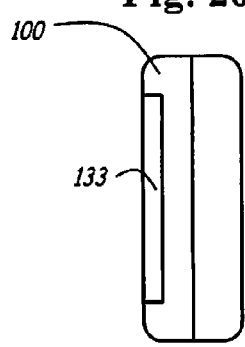
FIG. 21 is a right side view of the synchronizing tool of FIG. 15.
Figure 19:
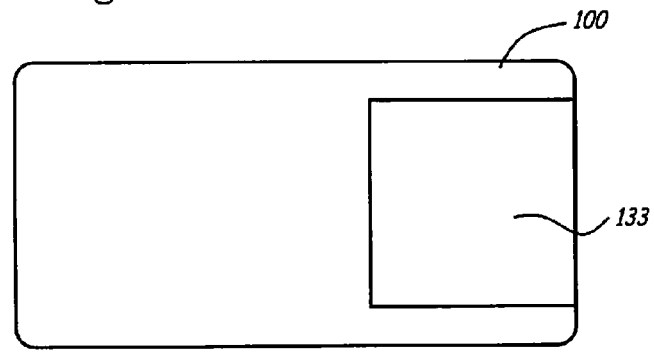
FIG. 19 is a rear view of the synchronizing tool of FIG. 15.
Figure 23:
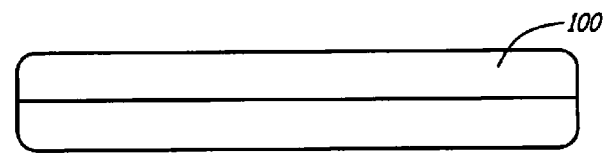
FIG. 23 is a bottom view of the synchronizing tool of FIG. 15.

Turning to FIG. 17, the logic 200 of the synchronization tool 100 begins with the user setting the video frame rate selector 201 to the desired number of video frames/per second preferred by the user. As shown, a 30 frames/second rate has been selected for the purpose of this disclosure. However, the choice is a matter of user preference. A rate of 29.97 frames/second is often chosen and 23.976 frames/second has become an industry standard.

With the frame rate selected, the frame timer 203 divides the frame time into 1000 slices and the increment frame slice counter 205 counts sequential slices of the video frame. The inquiry "Is Frame Complete?" 207 is then applied. If the answer is "No" 209, the system returns to the increment frame slice counter 205 and then repeats the inquiry 209 until the answer is "Yes" 211.

When the answer is "Yes" 211, the commands 213 are given to increment the frame counter (not shown) to advance the count and to reset the frame slice counter (not shown) to 0. The inquiry "Even Frame?" 215 is then made. If the answer is "No" 217, the system instructs 219 to load the frame count or number in the odd frame display and blank the even frame display. If the answer to the inquiry 215 is "Yes" 221, the system instructs 223 to load the frame count or number in the even frame display and blank the odd frame display.

Whenever an odd or even instruction 219 or 223 is given, the inquiry "Second Past?" 225 is made to determine whether sufficient video frames have occurred to constitute the passage of one second in the running time of the video shooting event. If the answer to the inquiry 225 is "No" 227, the system returns to increment the frame slice counter 205 and continues the process. If the answer to the inquiry 225 is "Yes" 229, the command 231 is given to increment the second counter (not shown) to advance the second count by 1. The command 233 is then given to reset the frame counter (not shown) to zero to begin the count anew.

Essentially the same process as above described for the second counter process is repeated for a minutes counter process through an inquiry 235, responses 237 or 239 and a command 241 until a minute is counted in the minute counter (not shown) and for an hours counted process through an inquiry 243, responses 245 or 247 and a command 249 until an hour is counted in the hour counter (not shown).

FIGS. 18-23 illustrate the overall simplicity and compactness of the tool 100 which, in a prototypical embodiment, is approximately 7¼" wide, 3⅜" high and 1¼" deep.

The principles disclosed herein could be applied using more than two video frame displays. The video frame displays can be dedicated to other than odd and even numbers or to other than numerical characters, as long as they are indicative of predetermined positions along the running time continuum and capable of indicating the existence of synchronization and of distinguishing adjacent frames to indicate the nature of a lack of synchronization. The video frame displays can be on any desired surface of the tool and in any desired orientation relative to each other.

Thus, it is apparent that there has been provided, in accordance with the invention, a video media clip synchronization tool that fully satisfies the objects and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A tool for synchronizing clips of video media recorded during a video shooting event comprising two video frame displays sequentially indicating frame numbers within a current second of the video shooting event, one of said video frame displays indicating odd numbered frames within the current second of the video shooting event and another of said video frame displays indicating even numbered frames within the current second of the video shooting event.

2. A tool according to claim 1 further comprising a timeline display indicating the running time of the video shooting event from a beginning thereof in hours, minutes and seconds.

3. A tool according to claim 1, a single said frame number being displayed when the clips of video media and said video frame displays are synchronized and adjacent said odd and even frame numbers being simultaneously displayed when the clips of video media and said video frame displays are not synchronized.

4. A tool according to claim 3 further comprising a timeline display indicating the running time of the video shooting event from a beginning thereof in hours, minutes and seconds.

* * * * *